United States Patent
Bae et al.

(10) Patent No.: US 11,926,682 B2
(45) Date of Patent: Mar. 12, 2024

(54) METHOD FOR PREPARING POLYMERIZATION INITIATOR COMPOSITION

(71) Applicant: LG CHEM, LTD., Seoul (KR)

(72) Inventors: Heung Kwon Bae, Daejeon (KR); Kyung Seog Youk, Daejeon (KR); Jung Rae Lee, Daejeon (KR); Hyun Min Lee, Daejeon (KR); Joong Chul Lim, Daejeon (KR); Min Jeong Kang, Daejeon (KR)

(73) Assignee: LG CHEM LTD., Seoul (KR)

( * ) Notice: Subject to any disclaimer, the term of this patent is extended or adjusted under 35 U.S.C. 154(b) by 700 days.

(21) Appl. No.: 17/056,973

(22) PCT Filed: Oct. 7, 2019

(86) PCT No.: PCT/KR2019/013092
§ 371 (c)(1),
(2) Date: Nov. 19, 2020

(87) PCT Pub. No.: WO2020/076024
PCT Pub. Date: Apr. 16, 2020

(65) Prior Publication Data
US 2021/0198388 A1    Jul. 1, 2021

(30) Foreign Application Priority Data

Oct. 11, 2018  (KR) .................. 10-2018-0120951

(51) Int. Cl.
*C08F 2/22* (2006.01)
*C08F 2/38* (2006.01)
*C08F 14/06* (2006.01)

(52) U.S. Cl.
CPC ................. *C08F 2/38* (2013.01); *C08F 2/22* (2013.01); *C08F 14/06* (2013.01)

(58) Field of Classification Search
CPC .................................. C08F 2/22; C08F 14/06
See application file for complete search history.

(56) References Cited

U.S. PATENT DOCUMENTS

| | | | | |
|---|---|---|---|---|
| 4,093,581 A | * | 6/1978 | Anderson | ............... C08F 14/06 524/767 |
| 5,216,065 A | * | 6/1993 | Colyer | ..................... C08F 2/24 526/86 |
| 2006/0122339 A1 | | 6/2006 | Meulenbrugge et al. | |
| 2007/0100098 A1 | | 5/2007 | Ooura et al. | |
| 2020/0181298 A1 | | 6/2020 | Lim et al. | |

FOREIGN PATENT DOCUMENTS

| | | |
|---|---|---|
| CN | 103265658 A | 8/2013 |
| CN | 103665237 A | 3/2014 |
| CN | 106496466 A | 3/2017 |
| JP | 07165803 A | 6/1995 |
| JP | H08-269114 A | 10/1996 |
| JP | 2005112907 A | 4/2005 |
| JP | 4130208 B2 | 8/2008 |
| KR | 10-1056958 B1 | 8/2011 |
| KR | 10-1111560 B1 | 2/2012 |
| KR | 10-2012-0043201 A | 5/2012 |
| KR | 10-2012-0107201 A | 10/2012 |
| KR | 10-2012-0130439 A | 12/2012 |
| KR | 10-2014-0115483 A | 10/2014 |
| KR | 10-2015-0030994 A | 3/2015 |
| KR | 10-1550954 B1 | 9/2015 |
| KR | 10-2018-0033691 A | 4/2018 |

OTHER PUBLICATIONS

Machine translation of KR 2014-0115483A (Year: 2014).*

* cited by examiner

*Primary Examiner* — Catherine S Branch
(74) *Attorney, Agent, or Firm* — Bryan Cave Leighton Paisner LLP

(57) ABSTRACT

The present disclosure provides a method for preparing a polymerization initiator composition, including (a) a step of mixing water and a water-soluble initiator to prepare an aqueous initiator solution having a concentration of 1 to 10%; and (b) a step of activating the aqueous initiator solution, wherein the step of activating is performed by (b-1) a step of heat treating the aqueous initiator solution for 0.5 to 4.5 hours at a temperature of 48 to 62° C.; and (b-2) a step of treating the aqueous initiator solution to achieve pH of 1 to 7, where the steps above are performed in no particular order.

8 Claims, No Drawings

METHOD FOR PREPARING POLYMERIZATION INITIATOR COMPOSITION

CROSS-REFERENCE TO RELATED APPLICATIONS

The present application is the U.S. national stage of International Application No. PCT/KR2019/013092, filed on Oct. 7, 2019, which claims the benefit of priority based on Korean Patent Application No. 10-2018-0120951, filed on Oct. 11, 2018, the disclosure of which are incorporated herein by reference in their entirety.

TECHNICAL FIELD

The present disclosure relates to a method for preparing a polymerization initiator composition, more particularly, the method for preparing a polymerization initiator composition, which is capable of reducing reaction time and increasing productivity by improving initial reactivity of polymerization during manufacturing a vinyl chloride-based polymer.

BACKGROUND ART

A vinyl chloride-based polymer is a resin including 50% or more of vinyl chloride, cheap and easy to control the hardness thereof, and applicable in most processing instruments, and thus, has various application fields. In addition, since the vinyl chloride-based polymer may provide a molded article having excellent physical and chemical properties, for example, mechanical strength, weather resistance, chemical resistance, etc., the vinyl chloride-based polymer is widely used in various fields.

Such a vinyl chloride-based polymer may be prepared in different types according to use. For example, a vinyl chloride-based polymer for straightening processing such as an extrusion process, a calendar process and an injection process is generally prepared by suspension polymerization, and a vinyl chloride-based polymer for paste processing such as dipping, spraying and coating is prepared by emulsion polymerization.

By the paste processing, generally, a vinyl chloride-based polymer latex for paste processing, obtained by emulsion polymerization is dried by a spray drying method to form final resin particles, and the particles are dispersed in a solvent or a plasticizer to be applied to products such as flooring materials, wall papers, tarpaulins, raincoats, gloves, car underbody coatings, sealants and carpet tiles, through processes such as coating (reverse roll-coating, knife coating, screen coating, spray coating), gravure and screen printing, rotation casting, and shell casting and dipping. Such a vinyl chloride-based polymer for paste processing alone has low processability, and its application is difficult, and accordingly, is processed into a plastisol type commonly composed of various additives such as a thermal stabilizer together with a plasticizer and used.

In the preparation method of the paste vinyl chloride-based polymer, a water-soluble initiator is used in a polymerization process such as emulsion polymerization, microsuspension polymerization and seed emulsion polymerization using an aqueous phase as a medium. Generally, water-soluble initiators show very sensitive half life to the temperature.

Meanwhile, in the conventional technique, in order to increase productivity in a polymerization process using an aqueous phase as a medium, the amount of a water-soluble initiator is increased and used, but due to the above-mentioned sensitivity problem to the polymerization temperature of the water-soluble initiator, the initial activation of polymerization is very slow and the reaction is delayed. On the contrary, the activation at latter part of polymerization is very active, and the temperature at latter part of the reaction is rapidly increased, and the heat removal of the reaction has limitation.

Therefore, research on a novel method which may improve productivity in a polymerization process of a vinyl chloride-based polymer using an aqueous phase as a medium is being continuously conducted.

PRIOR ART DOCUMENT

Patent Document

JP 4130208 B2 (May 30, 2008)

DISCLOSURE OF THE INVENTION

Technical Problem

An object of the present invention is to provide a method for preparing a polymerization initiator composition, which may decrease reaction time and improve productivity in case of being applied to a polymerization process of a vinyl chloride-based polymer using an aqueous phase as a medium, as a method for preparing a polymerization initiator composition.

Technical Solution

An embodiment of the present invention provides a method for preparing a polymerization initiator composition, including (a) a step of mixing water and a water-soluble initiator to prepare an aqueous initiator solution having a concentration of 1 to 10%; and (b) a step of activating the aqueous initiator solution, wherein the step of activating is performed by (b-1) a step of heat treating the aqueous initiator solution for 0.5 hours to 4.5 hours at a temperature of 48 to 62° C.; and (b-2) a step of treating the aqueous initiator solution to achieve pH of 1 to 7, where the steps above are performed in no particular order.

In another aspect, there is provided in the present invention a method for preparing a vinyl chloride-based polymer, including a step of polymerizing a vinyl chloride-based monomer in the presence of the initiator composition prepared by the above-described method.

In another aspect, there is provided in the present invention a plastisol including the vinyl chloride-based polymer prepared by the above-described method and having a viscosity at 25° C. of 90 to 230 Pa·S and white index after heating at 180 to 220° C. for 40 to 70 seconds of 48 to 60.

Advantageous Effects

In the method for preparing a polymerization initiator composition of the present invention, an aqueous initiator solution used for preparing the vinyl chloride-based polymer is activated through pre-treatment, and the initial reactivity of a polymerization process of the vinyl chloride-based polymer may become fast, reaction time may be reduced, and productivity may be improved.

BEST MODE FOR CARRYING OUT THE INVENTION

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "composition" used in the present disclosure includes a mixture of materials including a corresponding composition as well as a reaction product formed from the materials of the corresponding composition and the decomposition product of the corresponding composition.

The term "vinyl chloride-based polymer" used in the present disclosure represents all compounds produced by polymerizing a vinyl chloride-based monomer and may mean a polymer chain derived from a vinyl chloride-based monomer.

The term "plastisol" used in the present disclosure represents a mixture of a resin and a plasticizer so as to mold, cast or process into a continuous film phase by heating, for example, may represent a paste phase obtained by mixing a vinyl chloride-based polymer and a plasticizer.

The term "plasticizer" used in the present disclosure may represent an organic additive material which plays the role of improving molding processability of the resin at a high temperature by adding to a thermoplastic resin to increase thermoplasticity.

In the present disclosure, an average particle diameter ($D_{50}$) may be defined as a particle diameter corresponding to 50% of number accumulated amount in a particle diameter distribution curve of particles. The average particle diameter ($D_{50}$) may be measured using, for example, a laser diffraction method. The laser diffraction method may generally measure the particle diameter from a submicron region to about a few mm degree, and results with high reproduction and high resolution may be obtained.

An embodiment of the present invention provides a method for preparing a polymerization initiator composition, including (a) a step of mixing water and a water-soluble initiator to prepare an aqueous initiator solution having a concentration of 1 to 10%; and (b) a step of activating the aqueous initiator solution, wherein the step of activating is conducted by (b-1) a step of heat treating the aqueous initiator solution for 0.5 hours to 4.5 hours at a temperature of 48 to 62° C.; and (b-2) a step of treating the aqueous initiator solution to achieve pH of 1 to 7, where the steps above are performed in no particular order.

Hereinafter, each step will be explained in detail.

1. Preparation of Aqueous Solution of Water-Soluble Initiator

In the step of preparing an aqueous solution of a water-soluble initiator in the present invention, a water-soluble polymerization initiator is dissolved in water to a concentration of 1 to 10%.

The concentration of the aqueous initiator solution may preferably be 2 to 8%, or 3 to 6%. Within the concentration range, the amount of a water-soluble polymerization initiator which may be suitably activated in the step of activating an aqueous initiator solution, which will be described later, may be satisfied.

The water-soluble polymerization initiator may be one or more selected from the group consisting of potassium persulfate, sodium persulfate and ammonium persulfate, for example, potassium persulfate.

2. Activation of an Aqueous Solution of Water-Soluble Initiator

The step of activating the aqueous solution of a water-soluble initiator of the present invention is characterized in being conducted by (b-1) a step of heat treating the aqueous initiator solution at a temperature of 48 to 62° C.; and (b-2) a step of treating the aqueous initiator solution at a pH of 1 to 7, in no particular order.

The activation means the performance of both heat treatment and pH treatment for 0.5 hours to 4.5 hours, and for efficient and stable activation, heat treatment and pH treatment satisfying the above-described conditions are required to be performed. If heat treatment time for activation is less than 0.5 hours, polymerization time may be delayed, and productivity may be degraded, because the water-soluble initiator is injected in a not normally activated state. If the activation is performed for longer than 4.5 hours, an explosive reaction may occur and the removal of heat may be difficult. In addition, runaway reaction may arise, and it may be apprehended that stable polymerization reaction may not be carried out.

In order to stably accomplish such effects, preferably, the heat treatment time for the activation may be 1 hour or more, 1.5 hours or more, or 2 hours or more, and 4 hours or less, 3.5 hours or less, or 3 hours or less, most preferably, 1 to 3 hours. For polymerization productivity and the control of the reaction, the activation is preferably performed within the above-described range.

The activation time may be a time considering half life in the polymerization temperature of the water-soluble initiator, and may correspond to a time of $1/15$ to $1/5$ degree of the half life of the initiator, preferably, $1/14$ or more, or $1/13$ or more, or $1/12$ or more, and $1/6$ or less, or $1/7$ or less, or $1/8$ or less. The half life of the initiator means a time required to be $1/2$ of an initial value of the concentration of the initiator.

For example, the polymerization of a vinyl chloride-based polymer is generally performed in a temperature range of 40 to 65° C. In this case, the heat treatment time of the aqueous initiator solution may be determined considering the half life of the water-soluble initiator, and in this regard, since the half life of the water-soluble polymerization initiator decreases according to the increase of the temperature, the activation time at a polymerization temperature of 65° C. may be controlled shorter, and the activation time at a polymerization temperature of 40° C. may be controlled relatively longer.

In addition, the heat treatment temperature may be applied in a range of 48 to 62° C., and may be 60° C. or less, 59° C. or less, or 58° C. or less, or 56° C. or less, and 50° C. or more, 51° C. or more, or 52° C. or more, or 53° C. or more.

If the heat treatment temperature is greater than 62° C. and if the vinyl chloride-based polymer thus produced is applied to a plastisol, there are problems of increasing viscosity and degrading heat resistance, or inducing excessive activation of the aqueous initiator solution to unrealize normal polymerization including making explosive reaction. In addition, if the heat treatment temperature is less than 48° C., the activation of the aqueous initiator solution may not be suitably achieved.

The heat treatment method of the aqueous initiator solution is not specifically limited, and a common method may be used. For example, in case of a pilot scale, heat treatment may be performed using a hot plate. In addition, in case of a factory scale, the heat treatment may be performed using a temperature regulator, a thermometer, a rheometer, etc. After that, the heat treated initiator may be injected to a reactor using a pressure pump.

In case of using the water-soluble initiator, a base such as NaOH, which is a buffer material at the beginning of polymerization reaction and a radical react for carboxylation, and the carboxylated material may play the role of an emulsifier, and accordingly, the activity of an initiator is markedly degraded. Accordingly, in the present invention, an acid treatment step is performed with respect to the aqueous initiator solution prior to polymerization reaction to prevent the carboxylation reaction, and then, the water-soluble initiator may be activated.

Particularly, the pH treatment time may be, for example, 2 hours or less, or 1.5 hours or less, and 10 minutes or more, 20 minutes or more, 30 minutes or more, or 1 hour or more. Such pH treatment is preferably performed until a suitable pH value is achieved, and a treatment time is not specifically limited.

The pH treatment may also be suitably controlled according to the polymerization temperature as the heat treatment. pH may be decreased in the polymerization temperature of a high temperature, and pH may be increased in the polymerization temperature of a low temperature. The pH may be suitably controlled within the range.

In addition, the pH range may be pH 6.5 or less, or 6 or less, or 5.5 or less, and greater than pH 1.5, or greater than 3, or greater than 3.5, or greater than 4, or greater than 4.5.

In the pH treatment, if pH is less than 1, particle stability may be decreased, aggregation may arise, and normal polymerization may not be achieved. This is because in a step of growing particles after initiating nucleation, an emulsifier plays the role of stabilizing particles, but in an excessively low pH, an emulsifier is sensitive, and particle stability may be degraded.

In addition, in the pH treatment, if pH is greater than 7, the activation of the aqueous initiator solution may not be suitably achieved, and there may be problems of increasing polymerization time.

The pH treatment of the aqueous solution of the water-soluble initiator may be controlled using an aqueous HCl solution and/or an aqueous NaOH solution with a concentration of 1 to 10%, or 2 to 8%, or 5 to 7%.

In addition, the heat treatment and pH treatment may be performed in no particular order. For example, the aqueous solution of the water-soluble initiator may be heat treated and then pH treated, pH treated and then heat treated, or heat treated and pH treated simultaneously, as necessary.

The activation of the aqueous solution of the water-soluble initiator using the heat treatment and/or pH treatment may be performed first in a reactor tank before the polymerization step of a vinyl chloride-based monomer, which will be explained later. Alternatively, the aqueous solution of the water-soluble initiator may be injected to a reactor tank after achieving the activation of the aqueous solution of the water-soluble initiator at the outside of the reactor tank, or any one among the heat treatment and the pH treatment as the activation step may be performed at the outside of the reactor tank.

For example, after performing the heat treatment of the aqueous solution of the water-soluble initiator in the reactor tank, a pH regulator may also be injected to perform the pH treatment in the reactor tank. Alternatively, after performing the heat treatment of the aqueous solution of the water-soluble initiator at the outside of the reactor tank, the pH treatment may be performed while injecting the heat treated aqueous solution of the water-soluble initiator together with a pH regulator in the reactor tank, without specific limitation.

3. Polymerization of Vinyl Chloride-Based Monomer

Another embodiment of the present invention provides a method for preparing a vinyl chloride-based polymer, including a step of polymerizing a vinyl chloride-based monomer in the presence of the polymerization initiator composition prepared by the above-described method.

The polymerization of the vinyl chloride-based monomer may be performed at a polymerization temperature of 40 to 65° C., or 45 to 55° C. If polymerization is performed in the above-described temperature range, the activity of an aqueous initiator solution may be suitably maintained, and polymerization efficiency may be excellent.

That is, if the polymerization is performed in the presence of the polymerization initiator composition, the polymerization may be completed within 5 hours to 9 hours in a high conversion ratio, and a polymer having excellent physical properties may be prepared. Accordingly, polymerization efficiency may be excellent, and productivity increase may be expected.

The polymerization may be selected from the group consisting of emulsion polymerization, microemulsion polymerization and microsuspension seed polymerization using an aqueous phase as a medium. For example, in case of emulsion polymerization, a water-soluble initiator is widely used, and the application of the polymerization initiator composition prepared according to the present invention may be preferably applied. The polymerization method may be applied not much differently from commonly performed emulsion polymerization, microemulsion polymerization, microsuspension seed polymerization, etc., conducted in the art.

4. Vinyl Chloride-Based Polymer

Another embodiment of the present invention provides a vinyl chloride-based polymer prepared by the preparation method.

The vinyl chloride-based polymer may have an average particle diameter of 0.1 to 2 μm, or 0.5 to 1.5 μm, without specific limitation.

5. Plastisol

Another embodiment of the present invention provides a plastisol including the vinyl chloride-based polymer, having a viscosity at 25° C. of 90 to 230 Pa·s, or 100 to 120 Pa·s, and white index after heating at 180 to 220° C. for 40 to 70 seconds of 48 to 60, or 50 to 54.

If the plastisol of the present invention satisfies the above-described viscosity range, flowability may be improved, and processability may be excellent.

In addition, if the plastisol of the present invention satisfies the white index after heating under the above-described conditions, heat resistance may be excellent.

In the present invention, the plastisol may further include a plasticizer in 40 parts by weight to 180 parts by weight, preferably, 80 parts by weight to 160 parts by weight, more preferably, 100 to 140 parts by weight with respect to 100 parts by weight of the vinyl chloride-based polymer, and may further include an additive such as a dispersion diluent, a thermal stabilizer, a viscosity regulator and a foaming agent, as necessary.

The plasticizer and additive may be common ones well-well-known in the art.

EXAMPLES

Hereinafter, the present invention will be explained in more detail referring to Examples and Experimental Examples. However, the Examples and Experimental Examples are only for illustrating the present invention and the scope of the present invention is not limited thereto.

Example 1

Activation of Water-Soluble Initiator

To a reactor tank, 10 g of potassium persulfate (KPS) as a water-soluble initiator and 240 g of water were injected and mixed to prepare a 4% aqueous solution. In the reactor tank, the aqueous solution was heat treated while keeping stirring force at a temperature of 50° C. for 60 minutes using a hot plate.

After the heat treatment, a 1% HCl aqueous solution and a 5% NaOH aqueous solution were added in 0.01-0.1 phm, respectively, to treat the aqueous solution to achieve pH in a range of 1 to 4.

Preparation of Vinyl Chloride-Based Polymer

In the reactor tank to which the activated aqueous solution of the water-soluble initiator was injected, a paste PVC was polymerized by an emulsion polymerization method according to the order below. First, 180 kg of polywater (100 phm based on vinyl chloride monomer) and 18 kg of a first emulsifier (0.01 phm based on vinyl chloride monomer) were injected thereto, followed by elevating the temperature to 50° C. Then, 180 kg of a vinyl chloride monomer was injected, and 1800 g of a second emulsifier (1 phm based on vinyl chloride monomer) for stabilizing particles during reaction was injected, and the reaction was performed until a conversion ratio reached 90%.

Examples 2 to 7 and Comparative Examples 1 to 11

Vinyl chloride-based polymers according to Examples 2 to 7 and Comparative Examples 1 to 11 were obtained by the same method as in Example 1 except for changing the activation conditions of water-soluble initiators as shown in Table 1 below.

Experimental Example 1: Evaluation of Overall Results

As each polymerization result of the Examples and the Comparative Examples, polymerization time and whether normal polymerization is performed or not are also shown in Table 1 below.

1) Polymerization time: Polymerization time was obtained by measuring a time from the injection of polymerization supplementary and after elevating the temperature to a polymerization temperature to a point where a reaction pressure of 3.5 KG/cm 2.

2) Deciphering whether normal polymerization was performed or not: Whether or not normal polymerization was performed was evaluated by checking the aggregate through the aggregation of latex with the naked eye and was evaluated by O if aggregate was not confirmed, X if aggregate was confirmed, and X if latex was not obtained due to explosive reaction, etc.

TABLE 1

| | Heat treatment temperature (° C.) | Heat treatment time (hr) | Solvent pH | Time (hr) | Normal polymerization or not |
|---|---|---|---|---|---|
| Example 1 | 50 | 1 | 2.5 | 5 hr 43 min | ○ |
| Example 2 | 50 | 1 | 4.5 | 6 hr 57 min | ○ |
| Example 3 | 60 | 1 | 6.5 | 8 hr 30 min | ○ |
| Example 4 | 55 | 1 | 6.5 | 8 hr 53 min | ○ |
| Example 5 | 50 | 2 | 6.5 | 8 hr 53 min | ○ |
| Example 6 | 50 | 3 | 6.5 | 8 hr 30 min | ○ |
| Example 7 | 50 | 4 | 6.5 | 8 hr 12 min | ○ |
| Comparative Example 1 | 50 | 1 | — | 14 hr 27 min | ○ |
| Comparative Example 2 | — | 0 | 4.5 | 9 hr 20 min | ○ |
| Comparative Example 3 | — | — | 6.5 | 15 hr 0 min | ○ |
| Comparative Example 4 | 20 | 1 | 6.5 | 15 hr 20 min | ○ |
| Comparative Example 5 | 10 | 1 | 6.5 | 15 hr 20 min | ○ |
| Comparative Example 6 | 50 | 1 | 7.5 | 15 hr 10 min | ○ |
| Comparative Example 7 | 50 | 1 | 0.5 | — | X (aggregate) |
| Comparative Example 8 | 65 | 1 | 6.5 | 6 hr 28 min | ○ |
| Comparative Example 9 | 70 | 1 | 6.5 | — | X (explosive reaction) |
| Comparative Example 10 | 45 | 1 | 6.5 | 17 hr 40 min | ○ |
| Comparative Example 11 | 50 | 6 | 6.5 | 10 hr 20 min | ○ |

Referring to Table 1, it could be confirmed polymerization was completed normally within a polymerization time of 5 hours to 9 hours for Examples 1 to 7, but the polymerization time was significantly long for Comparative Example 1 in which only heat treatment was performed, Comparative Example 2 in which only pH treatment was performed, Comparative Example 3 in which activation was not performed, Comparative Example 4 in which pH conditions during activation were high, and Comparative Example 8 in which heat treatment temperature was low. In addition, it could be confirmed from the results that in Comparative Example 5 in which pH conditions were too low, aggregation was generated in the polymer latex state thus prepared, and in Comparative Example 7 in which temperature conditions were too high, explosive reaction occurred.

Experimental Example 2: Evaluation of Plastisol Performance

In order to compare and analyze the physical properties of each vinyl chloride-based polymer prepared according to Example 1 to Example 7 and Comparative Example 1 to Comparative Example 11, 100 g of each vinyl chloride-based polymer and 120 g of dioctyl phthalate (DOP) were stirred using Werke mixer (EUROSTAR IKA) in 800 rpm for 10 minutes to prepare each plastisol.

The viscosity and heat resistance (white index) of the plastisol thus prepared were measured by the methods below, and the results are shown in Table 2 below.

1) Viscosity: The viscosity of each plastisol was measured using BrookField viscometer (BrookField Co., LV-DV 1 Prime viscometer) at 25° C. with number 7 spindle in 20 rpm.

2) Heat resistance: Each plastisol was applied on a release paper, coated using a bar with 0.5 mm, and dried using Mathis oven at 150° C. for 45 seconds to manufacture a pregelling sheet, and then was heated at 200° C. for 100 seconds. According to ASTM E313-73, using SPECTRO PHOTO METER (CM-700d, KONICA MINOLTA), white index was measured.

TABLE 2

| | Time | Normal polymerization or not | Viscosity (Pa · s) | Heat resistance (WI) |
|---|---|---|---|---|
| Example 1 | 5 hr 43 min | ○ | 110 | 53 |
| Example 2 | 6 hr 57 min | ○ | 115 | 52.7 |
| Example 3 | 8 hr 30 min | ○ | 112 | 52.4 |
| Example 4 | 8 hr 53 min | ○ | 111 | 52.4 |
| Example 5 | 8 hr 53 min | ○ | 114 | 52.9 |
| Example 6 | 8 hr 30 min | ○ | 116 | 53.1 |
| Example 7 | 8 hr 12 min | ○ | 114 | 50.9 |
| Comparative Example 1 | 14 hr 27 min | ○ | 111 | 51.4 |
| Comparative Example 2 | 9 hr 20 min | ○ | 111 | 52.1 |
| Comparative Example 3 | 15 hr 0 min | ○ | 113 | 53.1 |
| Comparative Example 4 | 15 hr 20 min | ○ | 112 | 52.1 |
| Comparative Example 5 | 15 hr 20 min | ○ | 112 | 52.7 |
| Comparative Example 6 | 15 hr 10 min | ○ | 119 | 52.3 |
| Comparative Example 7 | — | X (aggregate) | — | — |
| Comparative Example 8 | 6 hr 28 min | ○ | 350 | 45 |
| Comparative Example 9 | — | X (explosive reaction) | — | — |
| Comparative Example 10 | 17 hr 40 min | ○ | 102 | 51.5 |
| Comparative Example 11 | 10 hr 20 min | ○ | 105 | 51.7 |

From the results of Table 2, it could be confirmed that in Comparative Example 6 in which the activation of a water-soluble initiator was performed at a temperature of 65° C., the reaction time was decreased but viscosity was markedly increased, and since low white index was shown by a heat resistance test, heat resistance was degraded. In addition, in Comparative Examples 1 to 4, 8 and 9, it was confirmed that the results on viscosity and heat resistance were relatively good, but polymerization time was excessively long.

However, it could be confirmed that in Examples 1 to 7 according to the present invention, polymerization was completed in a normal level, the generation of aggregation or the phenomenon of explosive reaction were not shown, and the viscosity or heat resistance of the plastisol was also excellent. That is, in case of performing polymerization reaction by activating an initiator according to an embodiment of the present invention, heat resistance may be secured to an excellent degree as well as polymerization productivity, stability, and the processability of plastisol processing.

The invention claimed is:

1. A method for preparing a polymerization initiator composition, the method comprising:
   (a) mixing water and a water-soluble initiator to prepare an aqueous initiator solution having a concentration of 1 to 10%; and
   (b) activating the aqueous initiator solution, performed by
      (b-1) heat treating the aqueous initiator solution for 0.5 hours to 4.5 hours at a temperature of 48 to 62° C.; and
      (b-2) treating the aqueous initiator solution to achieve pH of 1 to 7,
      wherein the steps (b-1) and (b-2) are performed in no particular order.

2. The method of claim 1, wherein the water-soluble initiator is one or more selected from the group consisting of potassium persulfate, sodium persulfate and ammonium persulfate.

3. The method of claim 1, wherein the aqueous initiator solution has a concentration of 3 to 6%.

4. The method of claim 1, wherein, in the step of (b-1), the aqueous initiator solution is heat treated at a temperature of 50 to 60° C.

5. The method of claim 1, wherein, in the step of (b-1), the aqueous initiator solution is heat treated for 1 to 4 hours.

6. A method for preparing a vinyl chloride-based polymer, the method comprising: polymerizing a vinyl chloride-based monomer in the presence of the initiator composition prepared according to claim 1.

7. The method of claim 6, wherein the polymerization is performed at a polymerization temperature of 40 to 65° C.

8. The method of claim 6, wherein the polymerization is emulsion polymerization.

* * * * *